United States Patent
Lim et al.

(10) Patent No.: US 10,164,517 B2
(45) Date of Patent: Dec. 25, 2018

(54) VOLTAGE REGULATOR WITH JITTER CONTROL

(71) Applicant: Altera Corporation, San Jose, CA (US)

(72) Inventors: Teik Wah Lim, Pulau Pinang (MY); Ashraf Lotfi, Bridgewater, NJ (US)

(73) Assignee: ALTERA CORPORATION, San Jose, CA (US)

( * ) Notice: Subject to any disclaimer, the term of this patent is extended or adjusted under 35 U.S.C. 154(b) by 15 days.

(21) Appl. No.: 15/239,606

(22) Filed: Aug. 17, 2016

(65) Prior Publication Data

US 2018/0054110 A1    Feb. 22, 2018

(51) Int. Cl.
*H02M 1/14*    (2006.01)

(52) U.S. Cl.
CPC ............ *H02M 1/143* (2013.01); *H02M 1/14* (2013.01)

(58) Field of Classification Search
CPC ........... H02M 1/14; H02M 1/143; H02M 1/15
See application file for complete search history.

(56) References Cited

U.S. PATENT DOCUMENTS

| | | | | |
|---|---|---|---|---|
| 6,069,521 A * | 5/2000 | Taylor | ..................... | H02M 3/07 307/110 |
| 6,246,294 B1 | 6/2001 | Gai | | |
| 6,445,257 B1 * | 9/2002 | Cox | ..................... | H03B 5/1231 331/117 R |
| 6,518,712 B2 * | 2/2003 | Weng | ................. | H05B 41/2883 315/209 R |
| 7,385,357 B2 * | 6/2008 | Kuennen | ................... | A61L 2/10 315/224 |
| 8,395,914 B2 * | 3/2013 | Klootwijk | ............... | H02M 3/07 363/147 |
| 8,780,666 B2 * | 7/2014 | Daudelin | ............... | G11C 5/147 327/536 |
| 9,035,564 B1 * | 5/2015 | Itoi | ......................... | H01T 15/00 315/224 |
| 9,491,815 B2 * | 11/2016 | Jin | ...................... | H05B 33/0809 |
| 2009/0115391 A1 | 5/2009 | Chuang et al. | | |
| 2009/0267579 A1 | 10/2009 | Kim et al. | | |
| 2009/0322414 A1 * | 12/2009 | Oraw | ...................... | H02M 3/07 327/537 |
| 2010/0194471 A1 | 8/2010 | Raghunathan et al. | | |
| 2011/0148312 A1 * | 6/2011 | Zhang | ................ | H05B 33/0806 315/185 R |
| 2015/0061529 A1 * | 3/2015 | Hsiung | .............. | H05B 33/0815 315/210 |
| 2015/0192942 A1 | 7/2015 | Smith et al. | | |
| 2016/0013662 A1 * | 1/2016 | Wakabayashi | .......... | H02J 5/005 307/104 |
| 2016/0285300 A1 * | 9/2016 | Summers | ................ | H02J 7/025 |

OTHER PUBLICATIONS

PCT/US2017/041871 International Search Report and Written Opinion dated Oct. 18, 2017.

* cited by examiner

*Primary Examiner* — Thomas J Hiltunen
(74) *Attorney, Agent, or Firm* — Fletcher Yoder, P.C.

(57) ABSTRACT

A voltage regulator package includes a voltage regulator module that outputs a voltage signal of a particular voltage level through an output terminal is provided. The voltage regulator module may be switched on according to a periodic signal having a periodic signal frequency as a variable. The periodic signal frequency may be tuned to reduce impedance, jitter, or noise.

15 Claims, 6 Drawing Sheets

VOLTAGE REGULATOR WITH JITTER CONTROL

BACKGROUND

This disclosure relates to jitter-controlled voltage regulation for an integrated circuit device.

This section is intended to introduce the reader to various aspects of art that may be related to various aspects of these techniques, which are described and/or claimed below. This discussion is believed to be helpful in providing the reader with background information to facilitate a better understanding of the various aspects of this disclosure. Accordingly, it should be understood that these statements are to be read in this light, and not as admissions of prior art.

Signal crosstalk phenomena may occur when a signal that is being transmitted through a circuit/signal channel of a circuit system generates an undesired effect on another circuit/signal channel within the circuit system. Signal crosstalk may be the result of undesired capacitive, inductive, or conductive couplings between the two circuits. The undesired effects that could be caused by the signal crosstalk phenomenon may include signal jitter and signal noise.

A decoupling capacitor is designed as part of a circuit system specifically to reduce the undesired effects arising from the signal crosstalk phenomenon. The decoupling capacitor may electrically decouple one circuit from another circuit and thereby reducing the undesired effects arising from the signal crosstalk. The decoupling capacitor has become an increasingly more influential component as many circuit systems operate at increasingly lower voltage levels.

Generally, a circuit system that operates at lower voltage levels may be more susceptible to the signal crosstalk phenomenon. Significant noise and/or jitter levels caused from the signal crosstalk phenomenon on these low voltage levels circuit systems may lead to undesired alteration of information carried by the signals of the circuit system. However, it is difficult to design a decoupling capacitor for a switching voltage regulator. The difficulty arises because a decoupling capacitor designer may have to consider multiple design factors, for example: a total impedance value, an inductance value, a capacitance value and also a switching frequency value of the voltage regulator. Furthermore, packaging trends that are leading towards integrating a switching voltage regulator and an integrated circuit die in a single package structure may also increase the difficulty of finding a proper placement for the decoupling capacitor within such a single package structure.

SUMMARY

Embodiments described herein include a voltage regulator package with a jitter control mechanism and a method of operating the jitter control mechanism. It should be appreciated that the embodiments can be implemented in numerous ways, such as a process, an apparatus, a system, a device, or a method. Several embodiments are described below.

In one embodiment, a voltage regulator package includes a voltage regulator module and a trim circuit. The voltage regulator module outputs a voltage signal of a particular voltage level through an output terminal. The voltage regulator module is switched on according to a periodic signal function having a periodic signal frequency as a variable. In one embodiment, an oscillator circuit that is coupled to the voltage regulator module may generate a periodic signal that is based on the periodic signal function and transmit the period signal to the voltage regulator module. The trim circuit may be programmable to change the periodic signal frequency of the periodic signal function. In one embodiment, the trim circuit may include multiple fuse elements. Different combinations of the fuse elements may correspond to different periodic signal frequency values.

In another embodiment, an integrated circuit package includes a package substrate, an integrated circuit die and a voltage regulator device. The integrated circuit die and the voltage regulator device are formed on the package substrate. The voltage regulator device may output a voltage signal for the integrated circuit die through an output terminal of the voltage regulator device. The voltage regulator device is a switching voltage regulator device that is controlled in accordance to a periodic signal function having a periodic signal frequency as a parameter. The periodic signal frequency may be tunable.

In another embodiment, a method of calibrating a voltage regulator device that is coupled to an integrated circuit die using a test apparatus includes determining a switching voltage regulator frequency value of the voltage regulator device that provides a lowest jitter value on an input/output (I/O) terminal of the integrated circuit die. The method also includes adjusting activation of the voltage regulator device based on the switching voltage regulator frequency value.

Further features of the disclosure, its nature and various advantages will be more apparent from the accompanying drawings and the following detailed description of the preferred embodiments.

DETAILED DESCRIPTION

The following embodiments may include a voltage regulator package with a jitter control mechanism and a method to operate the jitter control mechanism. It will be apparent, to one skilled in the art, that the present embodiments may be practiced without some or all of these specific details. In other instances, well-known operations have not been described in detail in order not to unnecessarily obscure the present embodiments.

Throughout this specification, when an element is referred to as being "connected" or "coupled" to another element, it may be directly connected or coupled to the other element or electrically connected or coupled to the other element with yet another element interposed between them.

Figure 1:
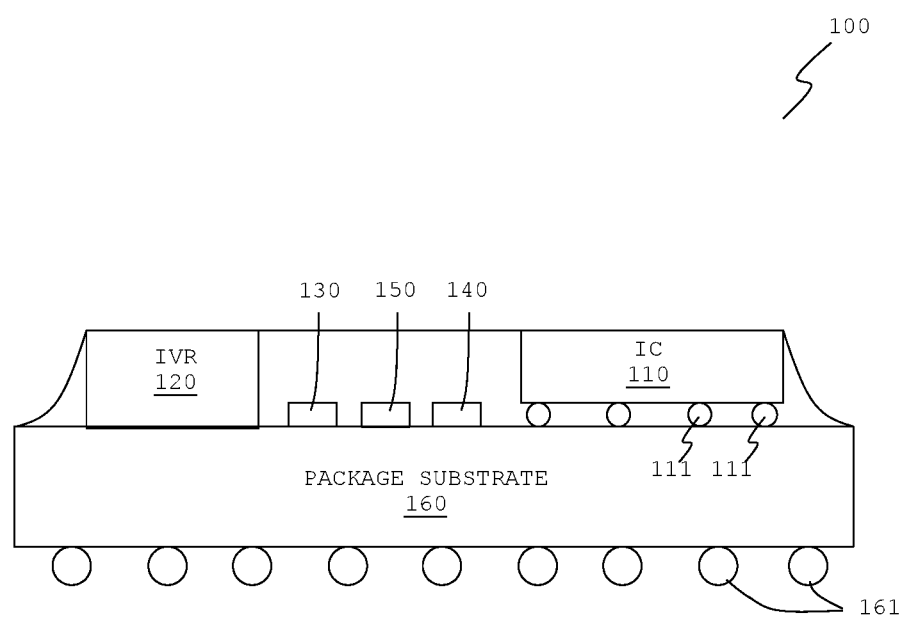
FIG. 1 shows an illustrative integrated circuit package in accordance with one embodiment of the present disclosure.

FIG. 1, meant to be illustrative and not limiting, illustrates an integrated circuit package in accordance with one embodiment of the present disclosure. Integrated circuit package 100 includes integrated circuit (IC) die 110, integrated voltage regulator (IVR) 120, inductors 130 and 150 and package substrate 160.

Integrated circuit package 100 may form a part of a wireless system, a wired system, or other types of systems. Hence, integrated circuit package 100 may include circuits that perform various functions that define the system. In one embodiment, integrated circuit package 100 may be an application specific integrated circuit (ASIC) device or an application specific standard product (ASSP) device. Additionally or alternatively, integrated circuit package 100 may be a programmable logic device (PLD), for example, a field programmable gate array (FPGA) device. It should be appreciated that a PLD may be configured to implement different user designs or applications. In one embodiment, the PLD may be configured as a memory controller. In another embodiment, the PLD may be configured as an arithmetic logic unit (ALU).

Integrated circuit package 100 may be placed on a printed circuit board (PCB) (not shown). Solder balls 161, which are located at a bottom layer of package substrate 160, may be coupled to their respective solder pads (not shown) on the PCB. Hence, integrated circuit package 100 may also be referred to as a ball grid array (BGA) package in some instances. In one embodiment, integrated circuit package 100 may transmit signals (e.g., input/output (I/O) signals) to a device mounted on the PCB through signal interconnections that are coupled to solder balls 161.

In some instances, integrated circuit package 100 may also be referred to as a system-in-package (SiP). The SiP is a package that includes a number of integrated circuits enclosed/housed in a single package. The SiP is designed to perform many of the functions of an electronic system while packaged as a single package. As shown in the embodiment of FIG. 1, integrated circuit package 100 may be a SiP that includes two different integrated circuits (i.e., integrated circuit die 110 and integrated voltage regulator 120) in one package.

Referring still to FIG. 1, integrated circuit package 100 includes integrated circuit die 110. Integrated circuit die 110 may be placed on a top surface of package substrate 160. As shown in the embodiment of FIG. 1, integrated circuit die 110 may be coupled to package substrate 160 through flip-chip interconnections 111. In one embodiment, flip-chip interconnections 111 may be controlled collapsed chip connections (C4) bumps. Pitch distances between flip-chip interconnections 111 may be more than 1 millimeter (mm).

Integrated circuit die 110 may perform core functions of integrated circuit package 100. In one embodiment, integrated circuit die 110 may include active circuits (e.g., transistor circuits). The active circuits within integrated circuit die 110 may include memory elements, programmable logic elements or arithmetic logic units that perform a variety of functions. In one embodiment, integrated circuit die 110 is an FPGA die when integrated circuit package 100 is an FPGA device.

Additionally, integrated circuit die 110 may include input/output (I/O) circuits (not shown). The I/O circuits are utilized to transmit signals out of integrated circuit die 110 or in to integrated circuit die 110. It should be appreciated that I/O circuits are designed according to a specific signal protocol. In one embodiment, integrated circuit die 110 may include I/O circuits for any chip interface protocol.

Integrated circuit package 100 also includes integrated voltage regulator 120. Integrated voltage regulator 120 may also be placed on the top surface of package substrate 160. However, integrated voltage regulator 120 may be coupled to package substrate 160 through a surface mounted technology (SMT) as shown in the embodiment of FIG. 1. However, it should be appreciated that a circuit designer generally has the option to select from many types of packaging technology (e.g., a flip-chip package, wirebond package, and so forth) when designing a product. Each of these packaging technologies may have their advantages and disadvantages. For example, the flip-chip packaging technology is preferred over other types of packaging technology when the designer considers small pitch distances as one of its most essential designing criteria. Additionally or alternatively, other packaging technologies (e.g., wirebond) may be preferred over other types of packaging technologies when the designer considers cost as one of its most essential designing criteria.

Referring back to FIG. 1, integrated voltage regulator 120 generates a voltage signal. In one embodiment, integrated voltage regulator 120 may be a switching voltage regulator. The switching voltage regulator may be switched on/off (i.e., activated/deactivated) in accordance with a periodic signal function to generate the voltage signal. Therefore, the voltage signal that may be generated by the switching voltage regulator corresponds to a function of continuous switching on/off.

In one embodiment, the periodic signal function may have periodic signal frequency as one of its parameter. In one embodiment, the integrated voltage regulator 120 may be switched on/off based on a duty cycle of a periodic signal. For example, integrated voltage regulator 120 is switched on when the periodic signal is at positive voltage levels, and integrated voltage regulator 120 is switched off when the periodic signal is zero (or negative) voltage levels. In one embodiment, integrated voltage regulator 120 may be a buck converter, a boost converter or a buck-boost converter.

The switching on/off of integrated voltage regulator 120 may also generate a voltage signal that is similar to a square wave function. For example, when integrated voltage regulator 120 is switched on, the voltage signal may be at a particular voltage level (e.g., 3.3 volts (V)). However, when integrated voltage regulator 120 is switched off, the voltage signal may be at zero voltage level (e.g., 0 V).

An electrical current may be transmitted through an output terminal of integrated voltage regulator 120 as a result of the voltage signal. In one embodiment, when integrated voltage regulator 120 is switched on and hence the voltage signal is at the particular voltage level, the electrical current is at a particular current level (e.g., greater than 1 Ampere (A)). However, when integrated voltage regulator 120 is switched off and hence the voltage signal is at the zero voltage level, the electrical current decreases in its current level. As a result of this, integrated circuit die 110 that is coupled to the output terminal of integrated voltage regulator 120 may receive an average electrical current (e.g., 1 A) that is generated as result of constant switching of integrated voltage regulator 120.

Integrated voltage regulator 120 may include at least one decoupling capacitor. The decoupling capacitor may be formed within integrated voltage regulator 120. The decoupling capacitor may be coupled in a shunt manner to an interconnection that transmits an electrical current out from integrated voltage regulator 120. As stated in the background, the decoupling capacitor may be utilized to decouple one part of an electrical circuit from another part of the electrical circuit. In the embodiment of FIG. 1, the decoupling capacitor formed within the integrated voltage regulator 120 may be utilized to decouple integrated voltage regulator 120 from integrated circuit die 110. Furthermore, the decoupling capacitor may also be utilized to reduce voltage ripples on the voltage signal.

Additionally, decoupling capacitor 140 may be placed on package substrate 160. Decoupling capacitor 140 is placed external to integrated voltage regulator 120 as shown in the embodiment of FIG. 1. Similar to the decoupling capacitor that is in integrated voltage regulator 120, decoupling capacitor 140 may also be coupled in a shunt manner to the interconnection that transmits the electrical current out from integrated voltage regulator 120. Hence, decoupling capacitor 140 may also help to electrically decouple integrated voltage regulator 120 from integrated circuit die 110. Furthermore, decoupling capacitor 140 may also help to smoother rising and falling transients of the electrical current.

The decoupling capacitors may help integrated circuit die 110 to transmit signals using any suitable 10 transmission protocol. It should be appreciated that any noise as a result of a signal crosstalk phenomenon may affect quality of a signal, especially in terms of its jitter when transmitting using the IO Interface protocol.

Integrated circuit die 110 may be coupled with integrated voltage regulator 120 through, for example, one or more package traces (not shown) formed on or within package substrate 160. In one embodiment, package substrate 160 may be a multi-layered package substrate. The package traces may also be referred to as wire interconnections between integrated circuit die 110 and integrated voltage regulator 120. In addition to that, the wire interconnections may also be coupled to inductors 130 and 150 and/or decoupling capacitor 140. In the embodiment of FIG. 1, inductors 130 and 150 may be coupled in series to the wire interconnection.

Figure 2:
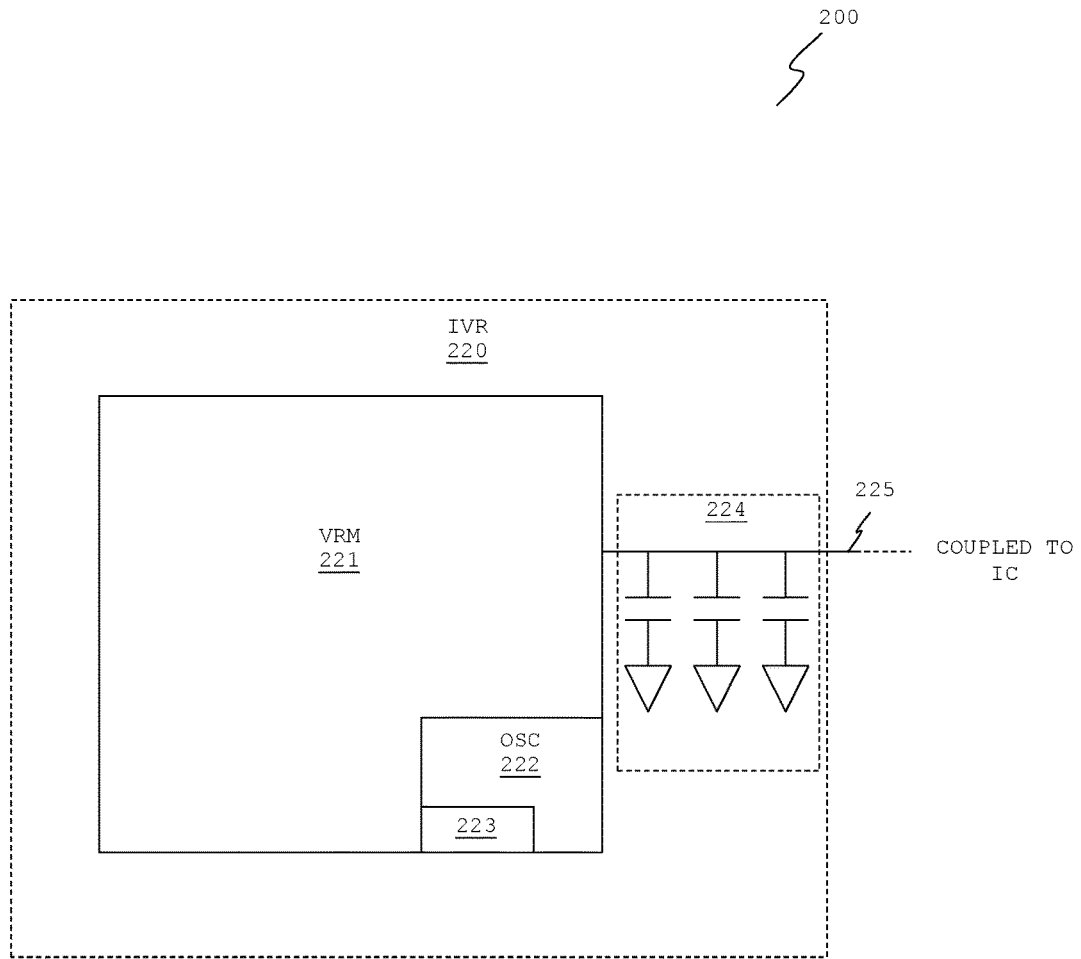
FIG. 2 shows an illustrative integrated voltage regulator (IVR) in accordance with one embodiment of the present disclosure.

FIG. 2, meant to be illustrative and not limiting, illustrates an integrated voltage regulator (IVR) in accordance with one embodiment of the present disclosure. Integrated voltage regulator 220 may be similar to integrated voltage regulator 120 of FIG. 1. As shown in the embodiment of FIG. 2, integrated voltage regulator 220 includes voltage regulator module 221, oscillator circuit 222, trim circuit 223 and decoupling capacitors 224.

Integrated voltage regulator 220 generates an electrical current that may be transmitted out of integrated voltage regulator 220 through wire interconnection 225. Wire interconnection 225 may connect integrated voltage regulator 220 to an integrated circuit die (e.g., integrated circuit die 110 of FIG. 1). Additionally, wire interconnection 225 may also be coupled to inductors (e.g., inductors 130 and 150 of FIG. 1).

Voltage regulator module 221, within integrated voltage regulator 220, may generate a voltage signal at a particular voltage level. In one embodiment, voltage regulator module 221 may be a switching voltage regulator module. embodiments of the switching voltage regulator module may include a buck converter, a boost converter and a buck-boost converter.

Referring still to FIG. 2, voltage regulator module 221 may be switching on/off (being activated or being deactivated) based on a periodic signal function. The periodic signal function may have a periodic signal frequency as one of its variable parameter. In one embodiment, the periodic signal function may be similar to a sine wave or a square wave.

In one embodiment, the electrical current that is output from voltage regulator module 221 may be at approximately 1 A with a peak voltage level of 3.3 V for the voltage signal. Furthermore, voltage ripples of a voltage signal output from voltage regulator module 221 may be less than 10 millivolt (mV) peak-to-peak (peak-to-peak). It should be appreciated that the peak-to-peak voltage is defined as a voltage difference between a maximum positive amplitude of the output signal and a maximum negative amplitude of the output voltage signal when voltage regulator module 221 is switched on.

Referring still to FIG. 2, oscillator circuit 222 may generate the periodic signal that is supplied to voltage regulator module 221. The periodic signal may be in accordance to the sine wave function or the square wave function. In one embodiment, oscillator circuit 222 may be a linear/harmonic oscillator.

As stated in the embodiment of FIG. 1, the periodic signal may be utilized to control the activation/deactivation of voltage regulator module 221. In one embodiment, when the periodic signal is being based on a sine wave function, voltage regulator module 221 may be in a switched-on mode when the sine wave function is having positive voltage levels, and is a switched-off mode when the sine wave function is having negative voltage levels. In another embodiment, when the periodic signal is being based on a square wave function, voltage regulator module 221 may be in a switched-on mode when the square wave function is having positive voltage levels, and is a switched-off mode when the square wave function is having negative voltage levels.

As the switching on/off (i.e., activation and deactivation) of voltage regulator module 221 is controlled by a frequency value of the periodic signal function, the frequency value of the periodic signal may also be referred to as a switching frequency (Fsw).

Referring still to FIG. 2, voltage regulator module 221 may also include trim circuit 223. Trim circuit 223 may be utilized to change the periodic signal frequency variable within the periodic signal function that controls voltage regulator module 221 (i.e., changing the switching frequency of the switching voltage regulator). In one embodiment, the periodic signal frequency variable is changed in order to obtain a relatively low output impedance at wire interconnection 225. The lower output impedance may help to reduce the voltage ripples on the voltage signal and may also help to reduce jitters on signals (digital/analog signals) in other circuits (e.g., comparators, signal processors, and the like.). In one embodiment, the voltage ripples on the voltage signal may be less than 10 mV peak-to-peak.

Trim circuit 223 may include a fuse circuit. Additionally or alternatively, trim circuit 223 may include an antifuse circuit. In one embodiment, fuse or antifuse circuit may include multiple fuse or antifuse elements, respectively. Different combinations of these fuse or antifuse elements may correspond to different adjustments to the switching frequencies of voltage regulator module 221. For example, a combination of fuse or antifuse elements may increase the switching frequency of the voltage regulator module 221 from its current value. Further, another combination of the fuse or antifuse elements may decrease the switching frequency of voltage regulator module 221 from its current value. The fuse elements within the fuse circuit generally include low resistive structures, which may break and form high resistance paths when applied high voltage. In contrast, the antifuse elements within antifuse circuits may generally include high resistive structures, which may break and form electrically conductive paths when a high current is applied.

Decoupling capacitors 224 may be coupled in a shunt manner to wire interconnection 225. As stated in FIG. 1, decoupling capacitors 224 may be utilized to decouple any noise generated by voltage regulator module 221 to interfere with any external circuits (e.g., integrated circuit die 110). As shown in the embodiment of FIG. 2, decoupling capacitor 224 is formed together with voltage regulator module 221 within one package. It should be appreciated that decoupling capacitors 224 and voltage regulator module 221 are formed within a single package house (i.e., within integrated voltage regulator 220) in order to increase the signal decoupling effectiveness of decoupling capacitors 224. In one embodiment, decoupling capacitors 224 may decrease voltage ripples by at least additional 10 mV peak-to-peak when compared to externally placed decoupling capacitors (e.g., on a printed circuit board next to a voltage regulator module).

The electrical current from integrated voltage regulator 220 may be transmitted out through wire interconnection 225. In one embodiment, the voltage signal that is generated by integrated voltage regulator 220 observes an output impedance value. The output impedance value depends on multiple factors. For example, the output impedance value may depend on inductance values of external inductors and capacitance values of internal and external decoupling capacitors. Furthermore, the output impedance value may also depend on the Fsw value of voltage regulator module 221.

In order to reduce jitter on signals at an external integrated circuit (e.g., integrated circuit die 110 of FIG. 1), voltage ripples of the voltage signal generated by integrated voltage regulator 220 have to be controlled. In one embodiment, the voltage ripples may be controlled by adjusting the switching frequency of voltage regulator module 221 so that an output impedance value (that depends on inductances and capacitances) is at a minimum value (Zmin). In one embodiment, signal jitter may be reduced by at least 50% when the switching frequency is adjusted to obtain a minimum output impedance value.

Figure 3:
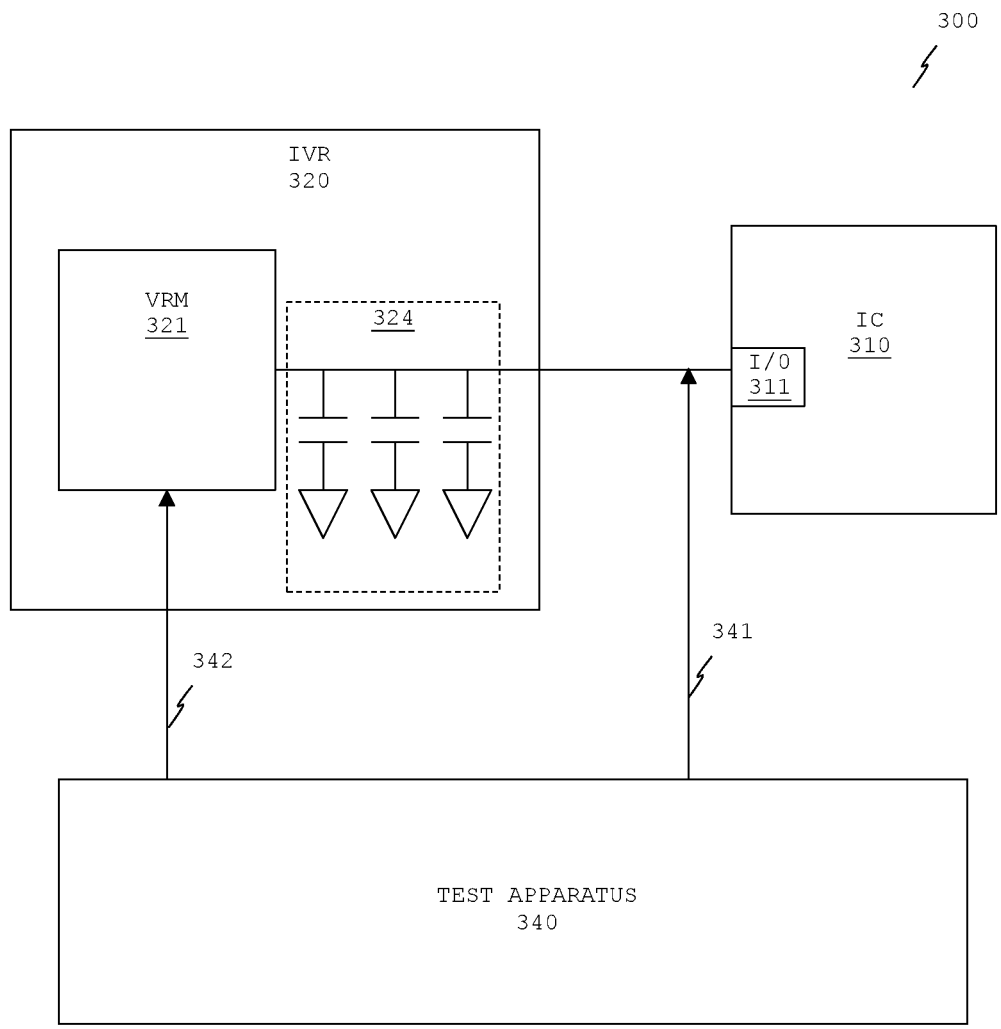
FIG. 3 shows an illustrative test setup to calibrate jitter control mechanism of an integrated voltage regulator for an integrated circuit die in accordance with one embodiment of the present disclosure.

FIG. 3, meant to be illustrative and not limiting, illustrates a test setup to calibrate a jitter control mechanism of an integrated voltage regulator for an integrated circuit die in accordance with one embodiment of the present disclosure. Test setup 300 include integrated voltage regulator (IVR) 320, integrated circuit die 310 and test apparatus 340. In one embodiment, integrated voltage regulator 320 may be similar to integrated voltage regulator 120 of FIG. 1 or integrated voltage regulator 220 of FIG. 2. Similarly, integrated circuit die 310 may be similar to integrated circuit die 110 of FIG. 1. Hence, for the sake of brevity, the details of integrated voltage regulator 320 and integrated circuit die 310 will not be repeated.

Integrated circuit die 310 may include I/O circuits 311 that are capable of transmitting signals. As described in the embodiment of FIG. 1, I/O circuits 311 may be utilized to transfer signals out of integrated circuit die 110 or in to integrated circuit die 110. The transferring of the I/O signals may be based on a particular signal transmission protocol. In one embodiment, the I/O circuit 311 is transferring signals using any suitable IO transmission protocol, such as LVDS or the like.

Test apparatus 340 may be coupled to voltage regulator module 321 through signal probe 342. Using signal probe 342, test apparatus 340 may control the switching control frequency of voltage regulator module 321 and may blow fuse elements formed in a trim circuit (e.g., trim circuit 222 of FIG. 2). In one embodiment, test apparatus 340 through signal probe 342 may direct voltage regulator module 321 to generate voltage signals for a range of switching voltage regulator frequencies.

Test apparatus 340 may also be coupled to a wire interconnection that couples I/O circuit 311 of integrated circuit die 310 and integrated voltage regulator 320 through probe 341. In the embodiment of FIG. 3, probe 341 may measure signal jitter for the I/O circuit 311. It should be appreciated that the signal jitter may be measured by sampling the signals transmitted through the I/O circuit 311. In one embodiment, test apparatus 340 may determine a switching voltage regulator frequency that generates a relatively low jitter after test apparatus 340 uses voltage regulator module 321 to generate the voltage signals for the range of switching voltage regulator frequencies. Once the switching voltage regulator frequency having the lowest jitter is obtained, test apparatus 340 may blow a combination of the fuse elements to fix integrated voltage regulator 320 to that switching frequency.

Figure 4:
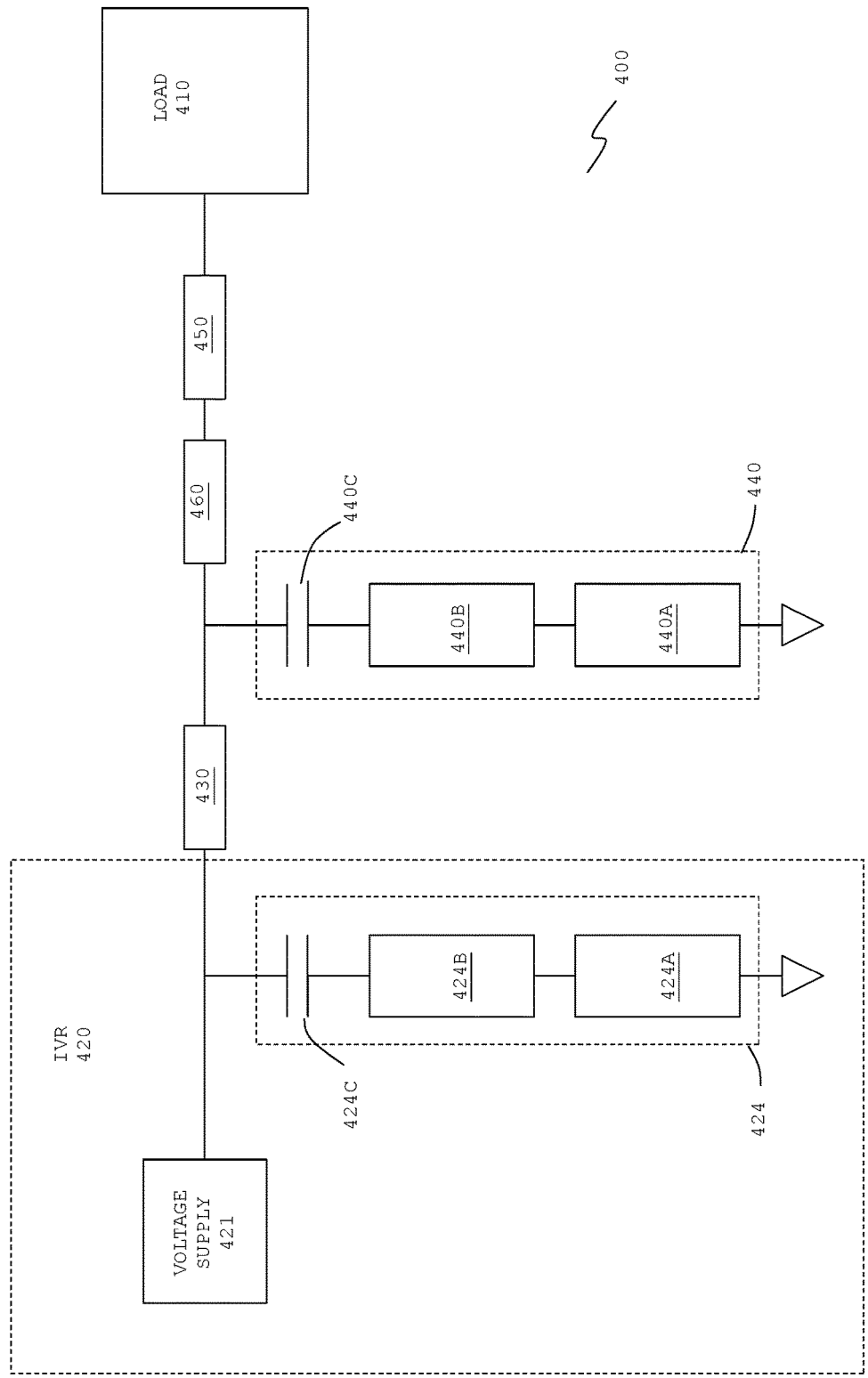
FIG. 4 shows an illustrative integrated circuit package in accordance with one embodiment of the present disclosure.

FIG. 4, meant to be illustrative and not limiting, illustrates an equivalent circuit of integrated circuit package 100 of FIG. 1 in accordance with one embodiment of the present disclosure. Circuit 400 includes load 410, voltage supply 420, inductors 430 and 450, decoupling capacitor 440, and equivalent series resistor (ESR) 460.

In an equivalent circuit, load 410 may represent integrated circuit die 110 of FIG. 1 or integrated circuit die 310 of FIG. 3. Load 410 may receive an electrical current that is generated by power supply module 420. In one embodiment, load 410 may represent an FPGA die.

Power supply module 420 may include voltage source 421 and decoupling capacitor 424. Voltage source 421 may represent voltage regulator module 221 of FIG. 2 or voltage regulator module 321 of FIG. 3. Voltage source 421 may generate a voltage signal at a particular voltage level (e.g., 3.3 V). In one embodiment, voltage source 421 may represent a switching voltage regulator. Similarly, decoupling capacitor 424 may be similar to decoupling capacitor 224 of FIG. 2 or decoupling capacitor 324 of FIG. 3. In one embodiment, decoupling capacitor 224 may have a capacitance value of 47 microfarad (µF).

Additionally, circuit 400 includes inductors 430 and 450 and ESR 460 that is coupled in series between integrated circuit die 410 and voltage regulator module 421. ESR 460 represents resistive package traces on a package substrate (e.g., package substrate 160 of FIG. 1). Circuit 400 also include decoupling capacitor 440 that is coupled in a shunt manner to an interconnection forming between integrated voltage regulator 420 and integrated circuit die 410.

As shown in the embodiment of FIG. 4, voltage supply 421 may be coupled to decoupling capacitor 424 in a shunt manner. In on embodiment, decoupling capacitor 424 may be further represented by capacitor 424C, equivalent series inductance (ESL) 424B and equivalent series resistance (ESR) 424A.

In parallel to decoupling capacitor 424, decoupling capacitor 440 may also be coupled in shunt manner to load 410. Decoupling capacitor 440 may have a portion of capacitance value of decoupling capacitor 424. In one embodiment, decoupling capacitor 440 may have capacitance value of 4.7 µF. Similar to decoupling capacitor 424, decoupling capacitor 440 may also be further represented by capacitor 440C, equivalent series inductance 440B and equivalent series resistance 440A.

Based on this equivalent circuit 400, low jitter levels on signals transmitted at/through load 410 may be possible when switching frequency of voltage source 421 (i.e., voltage regulator module 221 of FIG. 2 or voltage regulator module 321 of FIG. 3) is adjusted until decoupling capacitor 440 has a relatively lower impedance value. In addition, the low jitter levels on signals transmitted at/through load 410 may also be possible when the capacitance value of decoupling capacitor 424 is significantly larger than the capacitance value of decoupling capacitor 440.

Figure 5:
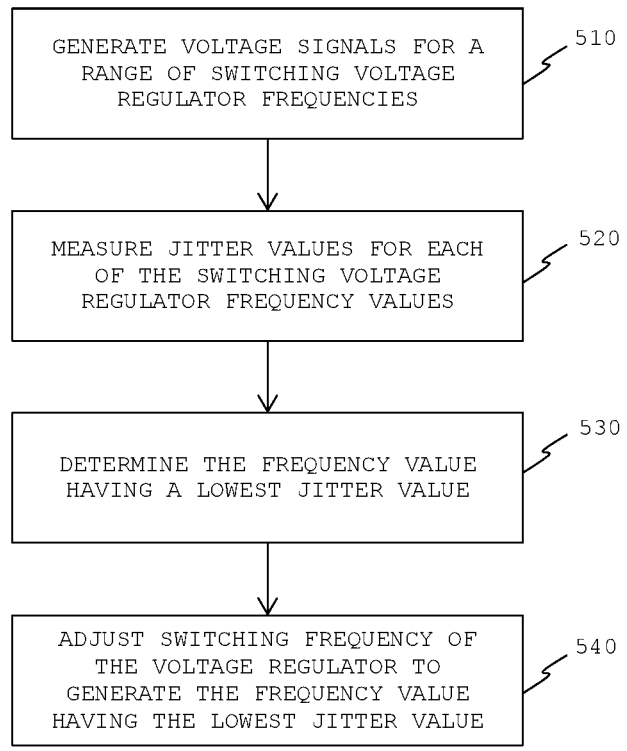
FIG. 5 shows a flowchart of an illustrative method for controlling jitter within an integrated circuit package using a test apparatus in accordance with one embodiment of the present disclosure.

FIG. 5, meant to be illustrative and not limiting, illustrates a flowchart of a method for controlling jitter within an integrated circuit package using a test apparatus in accordance with one embodiment of the present disclosure. In one embodiment, the integrated circuit package may be similar to integrated circuit package 100 of FIG. 1. The integrated circuit package includes an integrated circuit die (e.g., integrated circuit die 110 of FIG. 2 or integrated circuit die 310 of FIG. 3), an integrated voltage regulator (e.g., integrated circuit voltage regulator 120 of FIG. 1, integrated circuit voltage regulator 220 of FIG. 2 or integrated circuit voltage regulator 320 of FIG. 3) and at least one decoupling capacitor (decoupling capacitor 140 of FIG. 1). The test apparatus may be similar to test apparatus 340 of FIG. 3. In one embodiment, the test apparatus may be coupled to the integrated circuit device and the integrated voltage regulator using test probes (e.g., test probes 341 and 342).

At block 510, voltage signals for a range of switching voltage regulator frequencies are generated. The voltage signals are generated by the integrated voltage regulator. In one embodiment, the voltage signals are generated by the integrated voltage regulator when the test apparatus commands the integrated voltage regulator. The voltage signals are supplied to the integrated circuit die through a wire interconnection (e.g., wire interconnection 225 of FIG. 2). It should be appreciated that the integrated voltage regulator may generate the output voltages in a sweeping manner. For example, a first voltage signal is generated when the integrated voltage regulator is switching at a first frequency; a second voltage signal is generated when the integrated voltage regulator is switching at a second frequency, and so on. In one embodiment, the voltage signals are generated for switching frequencies near a roll-off frequency of the decoupling capacitor (e.g., between 1 MHz to 10 MHz).

At block 520, jitter values for each of the switching voltage regulator frequency are measured. In one embodiment, the jitter values are measured from an I/O circuit (e.g., I/O circuit 311 of FIG. 3) of an integrated circuit die (e.g., IC 310 of FIG. 3). The I/O circuit may be transmitting signals in accordance to the IO transmission protocol. The measured jitters may be transmitted to the test apparatus through the test probe. The test apparatus may store for the jitter values for each associated the switching voltage regulator frequencies.

At block 530, the test apparatus determines a switching voltage regulator frequency value that shows a relatively low jitter value. In one embodiment, the relatively low jitter value may be observed when the switching frequency of the integrated voltage regulator generates a voltage signal that may face relatively low impedance at the decoupling capacitor. The switching frequency may be similar to the roll-off frequency of the decoupling capacitor, in one embodiment.

At block 540, the switching frequency of the integrated voltage regulator is adjusted to a frequency value that generates the relatively low jitter value. In one embodiment, the trimming may be performed through a trim circuit (e.g., trim circuit 223 of FIG. 2). The trim circuit may include multiple fuse elements. In one embodiment, adjusting of the frequency value may be performed by blowing a combination of the fuse elements.

Figure 6:
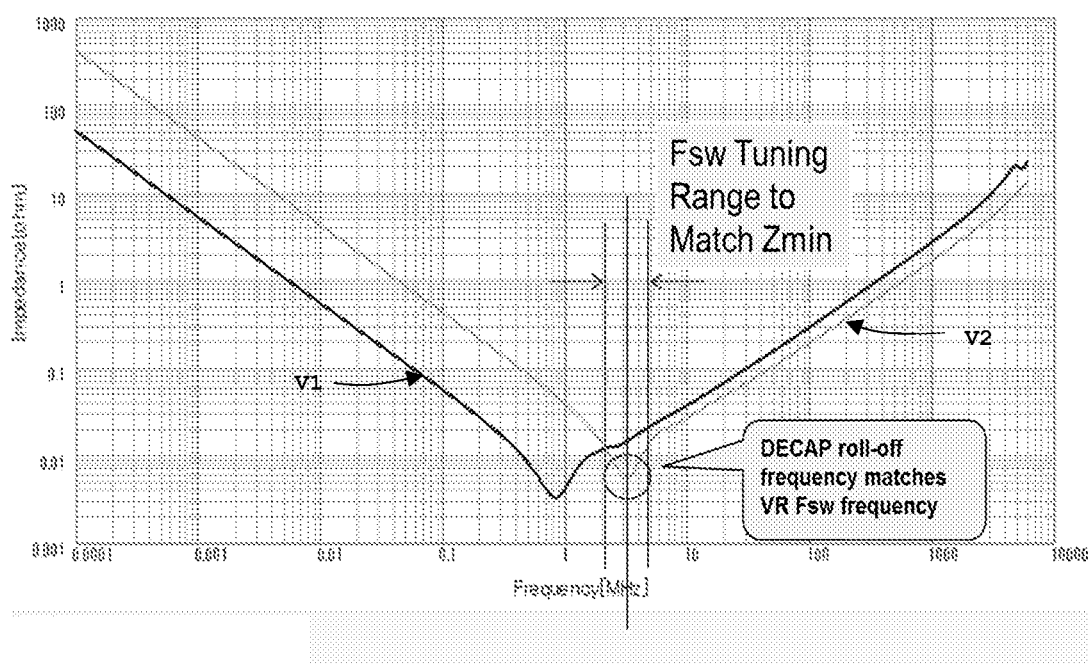
FIG. 6 shows two illustrative curves that show behavior of impedance values against different frequency values in accordance with one embodiment of the present disclosure.

FIG. 6, meant to be illustrative and not limiting, illustrates two curves that show behavior of impedance values against different frequency values in accordance with one embodiment of the present disclosure.

Curves V1 and V2 may be showing impedance values seen by voltage signals generated by an integrated voltage regulator when passing through decoupling capacitors. In one embodiment, the integrated voltage regulator may be similar to integrated voltage regulator 220 of FIG. 2 or integrated voltage regulator 320 of FIG. 3.

Further, the curve V1 may be impedance values seen the voltage signals when passing through an externally located decoupling capacitor to the integrated voltage regulator (e.g., decoupling capacitor 140 of FIG. 1 or decoupling capacitor 440 of FIG. 4). The curve V2 may be impedance values seen the voltage signals when passing through an internal located decoupling capacitor to the integrated voltage regulator (e.g., decoupling capacitor 140 of FIG. 1 or decoupling capacitor 440 of FIG. 4).

In one embodiment, the switching frequency is adjusted so that the Curve V2 may be having a relatively low impedance value (i.e., Zmin). The switching frequency may generate a voltage signal that has relatively low voltage ripple (i.e., 10 mV peak-to-peak). As a result of that, the electrical current transmitted to an integrated circuit die that is coupled to the integrated voltage regulator may have relatively low signal jitters.

The term "substantially" or "approximately", as may be used herein, provides an industry-accepted tolerance to its corresponding term. Such an industry-accepted tolerance ranges from less than one percent to twenty percent depending on the particular implementation and design, and corresponds to, but is not limited to, component values, integrated circuit process variations, temperature variations, rise and fall times, and/or thermal noise. As one may appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling (i.e., where one element is coupled to another element by inference) includes direct and indirect coupling between two elements in the same manner as "operably coupled". The term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the families of devices owned by Altera Corporation or Intel Corporation.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

Although the foregoing disclosure has been described in some detail for the purposes of clarity, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the appended claims.

What is claimed is:

1. A voltage regulator package, comprising:
   a voltage regulator module that outputs a voltage signal of a particular voltage level through an output terminal, wherein the voltage regulator module is switched on according to a periodic signal having a periodic signal frequency as a variable; and
   a trim circuit that statically defines the periodic signal frequency of the periodic signal to reduce an output impedance value on the output terminal.

2. The voltage regulator package as defined in claim 1, wherein the trim circuit is trimmed to cause the periodic signal frequency to result in a relatively lowest output impedance value on the output terminal.

3. The voltage regulator package as defined in claim 1, comprising:
   an oscillator circuit coupled to the voltage regulator module, wherein the oscillator circuit generates the periodic signal based at least in part on the periodic signal frequency defined by the trim circuit.

4. The voltage regulator package as defined in claim 3, wherein the trim circuit is coupled directly to the oscillator circuit.

5. The voltage regulator package as defined in claim 1, wherein the trim circuit comprises fuse circuitry that comprises a plurality of fuse elements, wherein different combinations of the fuse elements correspond to different frequency values of the periodic signal.

6. The voltage regulator package as defined in claim 1, wherein the voltage regulator module comprises a switching voltage regulator module.

7. The voltage regulator package as defined in claim 6, wherein the voltage regulator module comprises a boost converter circuit, a buck-boost converter circuit or any combination thereof.

8. The voltage regulator package as defined in claim 1, comprising:
   at least one decoupling capacitor that is coupled in a shunt manner to the output terminal of the voltage regulator module.

9. The voltage regulator package as defined in claim wherein the voltage regulator package is coupled to an external decoupling capacitor in a shunt manner to the output terminal of the voltage regulator module, wherein a capacitance value of the external decoupling capacitor is less than a capacitance value of the at least one decoupling capacitor.

10. An integrated circuit package, comprising:
    a package substrate;
    an integrated circuit die formed on the package substrate; and
    a voltage regulator device formed on the package substrate, wherein the voltage regulator device outputs a voltage signal through an output terminal for the integrated circuit die, wherein the voltage regulator device is activated based at least in part on a periodic signal having a periodic signal frequency as a parameter, and wherein the periodic signal frequency is configured to be tunable to a static value to reduce an output impedance value on the output terminal.

11. The integrated circuit package as defined in claim 10, wherein the integrated circuit die is coupled to the voltage regulator device through a wire interconnection.

12. The integrated circuit package as defined in claim 10, wherein a decoupling capacitor is formed on the package substrate and is coupled in parallel to the voltage regulator device and the integrated circuit die.

13. The integrated circuit package as defined in claim 10, wherein the integrated circuit die comprises a field programmable gate array, an application specific integrated circuit or an application specific standard product, or any combination thereof.

14. The integrated circuit package as defined in claim 10, wherein the voltage regulator device comprises:
    an oscillator circuit that generates the periodic signal having the periodic signal frequency.

15. The integrated circuit package as defined in claim 14, wherein the voltage regulator device comprises:
    a trim circuit that is programmable to tune the periodic signal frequency.

* * * * *